C. A. JOHNSON.
TOOL HOLDER FOR PLANERS.
APPLICATION FILED FEB. 26, 1916.

1,223,493.

Patented Apr. 24, 1917.

WITNESSES
Louis Lucia
E. F. Eaton

INVENTOR.
BY Charles A. Johnson,
Arthur B. Jenkins,
ATTORNEY.

UNITED STATES PATENT OFFICE.

CHARLES A. JOHNSON, OF UNIONVILLE, CONNECTICUT.

TOOL-HOLDER FOR PLANERS.

1,223,493.   Specification of Letters Patent.   Patented Apr. 24, 1917.

Application filed February 26, 1916. Serial No. 80,628.

*To all whom it may concern:*

Be it known that I, CHARLES A. JOHNSON, a citizen of the United States, and a resident of Unionville, in the county of Hartford and State of Connecticut, have invented a new and Improved Tool-Holder for Planers, of which the following is a specification.

My invention relates to the class of tool holders above named, and an object of my invention, among others, is to provide a tool holder of this class that shall be particularly steady and free from vibration in its operation and that shall, therefore, produce the most efficient results.

One form of device embodying my invention, and in the construction and use of which the objects herein set out, as well as others, may be attained, is illustrated in the accompanying drawings, in which—

Figure 1:
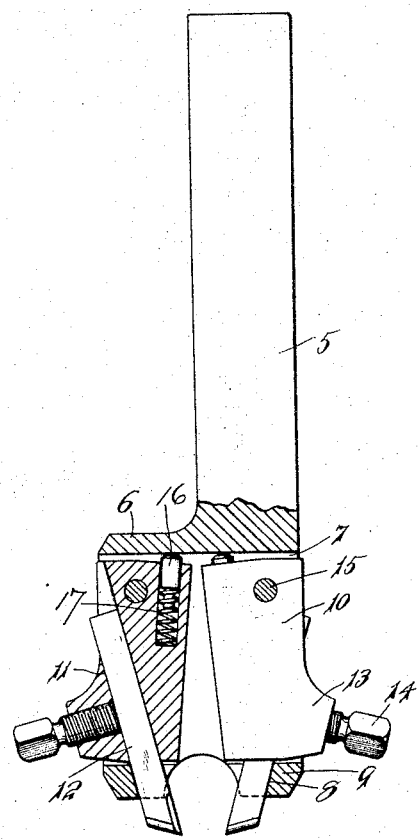
Figure 1 is a view in side elevation of a tool holder embodying my invention with parts broken away to show construction.
Figure 2:
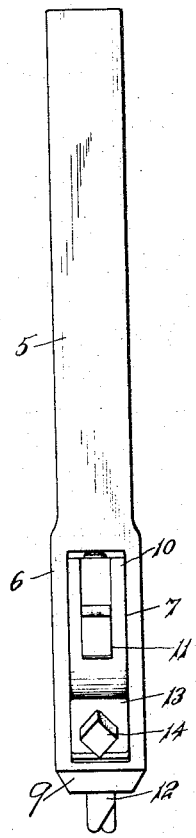
Fig. 2 is an edge view of the same.

A tool holder embodying my invention comprises a structure in which, while the tools are held in a movably mounted carrier, the parts are so arranged that the principal support for the tools during the cutting operation is in the holder that is rigidly secured in the usual manner, and the tool therefor, during the cutting operation, is rigidly held and is, therefore, particularly free from vibration and consequent "chatter." One form of my improved tool holder is shown in the accompanying drawings, which holder embodies a shank 5 having a head 6, preferably somewhat larger than the shank and having a tool carrier opening 7 extending through it from edge to edge and a tool slot 8 extending from said opening to the bottom edge of the head. This construction forms back stops or tool supports 9 on opposite sides of said slot.

Tool carriers 10 of a thickness approximately that of the width of the opening 7 are pivotally mounted in said opening on opposite sides of a central plane extending across said opening in a direction lengthwise of the holder, said carriers being supported as by pins 15. Holes 11 extending preferably in a longitudinal direction through the carriers are formed to receive tools 12 that are preferably secured in place as by set screws 14 fitting screw threaded openings in ears 13 extending laterally from the lower edges of the carriers. These carriers are of such length that their lower ends are located above the back stops or supports 9 and in their swinging movement pass above said supports, and the tools 12 extending out at the lower ends of the carriers are in a position to lie against the back stops or supports. The tools are of such width that they quite closely fit within the slots 8, the fit, however, being loose enough to permit unrestricted movement of the carriers 10. This arrangement causes the principal strains produced in the cutting action to be borne by the tools 12 and the head of the holder, the carriers, in fact, acting merely to carry the tools and permit them to yield and slide over the work in the movement of the planer carriage in one direction and to immediately position themselves against the supports when the cutting action again takes place. The tool is, therefore, for all practical purposes supported in the cutting operation by the rigidly mounted tool holder and vibration and "chatter" is therefore prevented and a practically smooth cutting operation is effected.

The carriers are normally positioned so that the tools will rest against their supports as by means of plungers 16 seated upon springs 17 in the upper ends of the carriers, said plungers pressing against the top wall of the opening 7.

Figure 3:
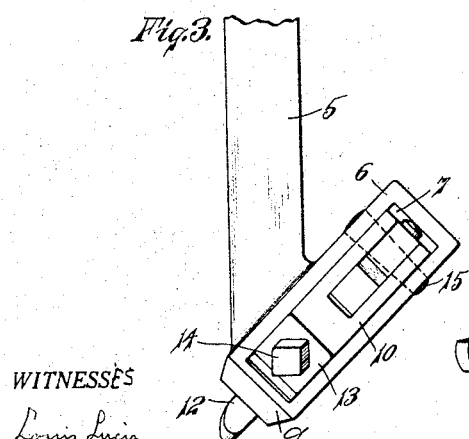
Fig. 3 is a view of the head of the holder showing an arrangement to enable the tool to cut on a vertically disposed surface.
Figure 4:
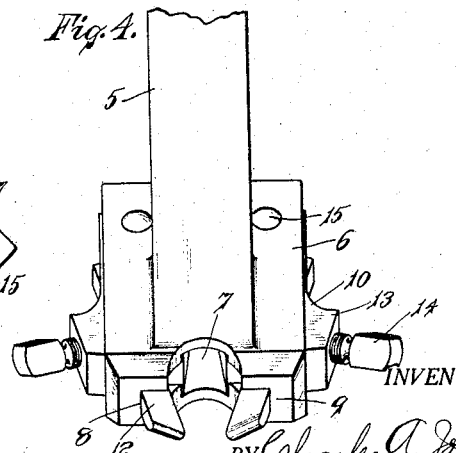
Fig. 4 is a view of the device shown in Fig. 3 as viewed from a point located at right angles to the point of view of Fig. 3.

The tool holder shown in Fig. 3 is the same as that above described with the exception that the head is diagonally arranged with respect to the shank so that the tool may operate upon a surface vertically disposed.

While I have shown and described herein a satisfactory form of construction embodying my invention, this may be departed from to a greater or lesser degree and yet be within the spirit and intent of the invention, as defined by the appended claims.

The tool has been described herein with especial reference to a planer, but it will be obvious that it may be equally well applied to any metal cutting machine in which the work and the cutting tool are relatively movable.

I claim—

1. A tool holder for a planer, said holder including a head having its edges arranged to face in the direction of movement of the carriage, said head having an opening extending through it from edge to edge, supports extending across said opening, carriers movably mounted to swing through said openings above said support, and a tool removably secured within each carrier and with its back edge adapted to rest against said support that resists the thrusts caused by the cutting operation.

2. A tool holder for a planer, said holder including a head arranged to have its edges face in the direction of movement of the planer carriage, said head having an opening extending through it from edge to edge, supports underlying said opening, carriers pivotally mounted within said opening to have a swinging movement above said supports, said carriers having holes, and tools removably secured in the holes in the carriers in position to rest with their back edges against said supports that resists all thrusts caused by the cutting operation.

3. A tool holder for metal cutting machines, said holder including a head having an opening therein, tool carriers pivotally mounted in said opening, supports extending across said opening, and tools removably secured within the carriers and projecting to rest against said supports during the cutting operation, said supports receiving the entire thrust caused by the cutting operation.

4. A tool holder for metal cutting machines, said holder including a head having an opening therein and with tool supports located at the lower end of the head, tool carriers pivotally mounted in said opening, and tools removably secured to the carriers and adjustable lengthwise therein, said tools resting against said supports that resist the entire force of the cutting action.

5. A tool holder for metal cutting machines, said holder including a head having an opening therein, tool carriers pivotally mounted in said opening, supports extending across said opening, tools removably secured within the carriers and projecting to rest against said supports that resist the entire force caused by the cutting operation, and spring seated plungers exerting a thrust upon the carriers at their upper ends to press said tools against said supports.

CHARLES A. JOHNSON.